US010331982B2

(12) United States Patent
Justice et al.

(10) Patent No.: US 10,331,982 B2
(45) Date of Patent: Jun. 25, 2019

(54) REAL TIME SIGNAL PROCESSOR FOR ANALYZING, LABELING AND EXPLOITING DATA IN REAL TIME FROM HYPERSPECTRAL SENSOR SUITES (HY-ALERT)

(71) Applicant: Irvine Sensors Corp., Costa Mesa, CA (US)

(72) Inventors: James W Justice, Newport Beach, CA (US); Medhat Azzazy, Laguna Niguel, CA (US); Virgilio Villacorta, Corona, CA (US)

(73) Assignee: Irvine Sensors Corp., Costa Mesa, CA (US)

( * ) Notice: Subject to any disclaimer, the term of this patent is extended or adjusted under 35 U.S.C. 154(b) by 0 days.

(21) Appl. No.: 15/457,000

(22) Filed: Mar. 13, 2017

(65) Prior Publication Data

US 2018/0349747 A1 Dec. 6, 2018

Related U.S. Application Data

(60) Provisional application No. 62/306,711, filed on Mar. 11, 2016.

(51) Int. Cl.
*G06K 9/62* (2006.01)
*G06K 9/00* (2006.01)
*G06K 9/46* (2006.01)

(52) U.S. Cl.
CPC ....... *G06K 9/6288* (2013.01); *G06K 9/00624* (2013.01); *G06K 9/4652* (2013.01); *G06K 9/4671* (2013.01); *G06K 2009/4657* (2013.01)

(58) Field of Classification Search
None
See application file for complete search history.

(56) References Cited

U.S. PATENT DOCUMENTS

| 8,098,886 | B2* | 1/2012 | Koch | G06K 9/4628 |
| | | | | 382/103 |
| 2009/0306741 | A1* | 12/2009 | Hogle | A61N 1/36082 |
| | | | | 607/54 |
| 2009/0312817 | A1* | 12/2009 | Hogle | A61B 5/0492 |
| | | | | 607/54 |
| 2010/0140461 | A1* | 6/2010 | Sprigle | G01J 3/2823 |
| | | | | 250/226 |
| 2014/0184803 | A1* | 7/2014 | Chu | G06T 7/292 |
| | | | | 348/159 |
| 2014/0301662 | A1* | 10/2014 | Justice | G06T 7/73 |
| | | | | 382/278 |

(Continued)

*Primary Examiner* — Delomia L Gilliard
(74) *Attorney, Agent, or Firm* — W. Eric Boyd, Esq.

(57) ABSTRACT

The Hy-ALERT processing system operates simultaneously on the data streams from visible and thermal imaging sensors and from hyperspectral imaging sensors. The visible and thermal image processing uses cognitive-inspired processing techniques that determine the salient content of the imagers based on the system user definition of salient content. The hyperspectral image processing uses anomaly detection and template matching techniques to determine the salient materials content of the observed scenes. Cross-correlation processing of the salient content of the various image and hyperspectral data streams enables the sensor systems to adapt their operating characteristics to optimize effectiveness in near real-time.

3 Claims, 3 Drawing Sheets

(56) References Cited

U.S. PATENT DOCUMENTS

| | | | | |
|---|---|---|---|---|
| 2016/0086050 A1* | 3/2016 | Piekniewski | ............. | G06T 7/90 382/103 |
| 2016/0092736 A1* | 3/2016 | Mai | ................... | G06K 9/00624 382/103 |
| 2016/0379085 A1* | 12/2016 | Dodballapur | ........ | G06K 9/6202 382/218 |
| 2017/0372153 A1* | 12/2017 | Justice | ................. | G06K 9/4628 |

* cited by examiner

Multi-GPU ISR Data Processor for Real-time Simultaneous Exploitation of Hypersprectral Data Images, Full Motion Video Data Sequences, and High Resolution Visible and Thermal Imagery. Low SWaP enables many deployment opportunities.

- 8.0 inches wide
- 8.5 inches deep
- 2.0 inches high
- Weight 1.8 kg

REAL TIME SIGNAL PROCESSOR FOR ANALYZING, LABELING AND EXPLOITING DATA IN REAL TIME FROM HYPERSPECTRAL SENSOR SUITES (HY-ALERT)

CROSS-REFERENCE TO RELATED APPLICATIONS

This application claims the benefit of U.S. Provisional Patent Application No. 62/306,711, filed on Mar. 11, 2016 entitled "A Real Time Signal Processor for Analyzing, Labeling, and Exploiting Data in Real time from Hyperspectral Sensor Suites (Hy-ALERT)" pursuant to 35 USC 119, which application is incorporated fully herein by reference.

STATEMENT REGARDING FEDERALLY SPONSORED RESEARCH AND DEVELOPMENT

NA

BACKGROUND OF THE INVENTION

1. Field of the Invention

The invention relates generally to the field of image processing. More specifically, the invention relates to a processing unit and methods for simultaneous real time processing of sensor data streams of still imagery, video imagery, thermal imagery and, hyperspectral imagery. Attributes in the scene are identified by running a plurality of processing algorithms on the image data which are in the form of convolutions on spatial, temporal, and color contents of the images which emulate the image processing of the human visual path consisting of eye, retina, and cortex. Additional simultaneous processing of hyperspectral data streams detect the presence of specific materials based on matching their spectral templates against imbedded catalogues of material properties and by detection of pixels whose spectral content are significantly different from the spectral content of the surrounding pixels. The invention produces object detections, object tracks, object classifications, and activity recognition and interpretations by means of cross-modal correlation of the different sensor analysis results. The negligible latency with which these results are produced enable the various sensor operating modes to be optimized during sensing operations.

2. Description of the Related Art

Current hyperspectral sensor systems generally consist of some form of sensor providing scene imaging which may be in the visible or infrared spectral regions and a hyperspectral imaging sensors which produces images of scenes in very many narrow spectral bands. Very large amounts of data are generated by these sensor systems and its exploitation is very time consuming and human interpreter intensive. Access to important scene content data is often significantly delayed. In addition the operations of the sensor suites are prearranged and do not respond in a short time to the actual observations being taken. Further, the spectral response of the hyperspectral sensors is not modifiable in short periods of time.

What is needed is a signal processing appliance that can analyze the content of the visible or infrared imagers and determine salient scene content. Simultaneous analysis of the hyperspectral scene data can identify materials of salient interest. The correlation of the salient image data with the salient hyperspectral data can improve the quality of information extraction from such sensors. If the processing can be performed with very low latency, in near real-time, then the timely extraction of actionable intelligence is greatly improved. If such data can be extracted in near real-time and on-board the sensors bearing platform's such as Unmanned Aerial Vehicles (UAVs), then a newly available detector technology that allows the detector spectral response to be changed in real-time can be incorporated into the hyperspectral sensors and their operations spectrally optimized based on real-time understanding of scene content and its implications for mission operations.

BRIEF SUMMARY OF THE INVENTION

The Hy-ALERT sensor processor concept combines cognitive-inspired image processing to determine salient object content of visible of thermal images of scenes. Anomaly detection and spectral signature matching processing identifies salient material content of observed scenes. Cross-correlation analysis of the salient contents of the imagers and hyperspectral sensors enables the near real-time interpretation of complex object/material combinations. The data extraction of highly salient information content of the data sets then will enable the optimization of the spectral sensing characteristics and priorities of the hyperspectral sensor. The intensive processing required by the Hy-ALERT processing paradigm is hosted on state of the art FPGA or GPU and CPU processor units who design and architectures are optimized for efficient and timely processing to support real-time exploitation if it adaptive capabilities.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following description of the preferred embodiments which are presented as illustrated examples of the invention in any subsequent claims in any application claiming priority to this application. It is expressly understood that the invention as defined by such claims may be broader than the illustrated embodiments described below.

DETAILED DESCRIPTION OF THE INVENTION

Military and commercial users have been developing airborne Hyper-Spectral Imaging or "HSI" sensor suites which contain hyperspectral imagers and combinations of visible and thermal imagers for the last twenty years as a means to recognize targets based upon their unique spectral signatures and associated scene content. However, an unanticipated problem resulted from this development, that is, HSI sensor suites are extremely high-data output sensors that are capable of quickly overwhelming the capacity of current air-to-ground communications links. Prior art attempts have partially solved this problem through on-board processing and reporting on a limited set of spectral signatures and recording all data for later post-mission analysis.

The assignee of the instant application, Irvine Sensors Corporation, discloses herein a sensor data processor for using in an HSI sensor suite that significantly increases the timeliness and effectiveness of the processing, exploitation, dissemination (PED) data.

Figure 2:
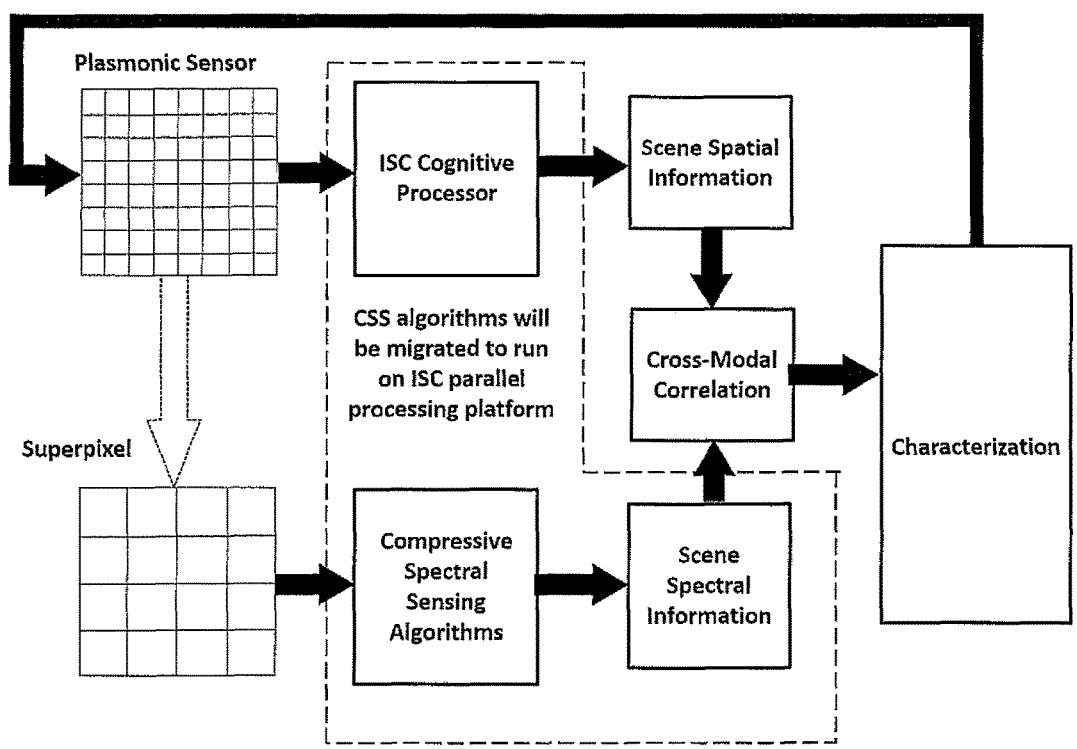
FIG. 2 illustrates the method whereby the invention enables hyperspectral sensors suite operations to be optimized "on the fly" based on the processor real-time analysis outputs.
Figure 3:
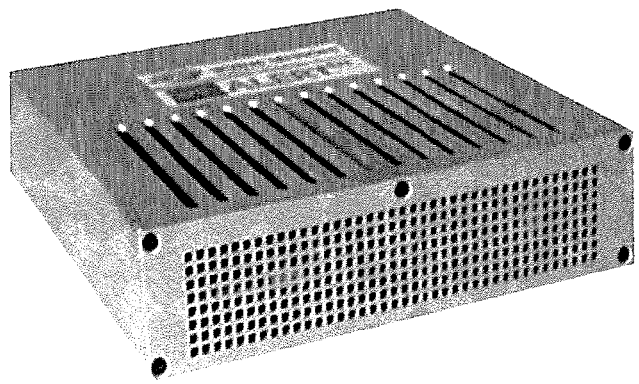
FIG. 3 illustrates the processor hardware using multiple Graphics Processing Units (GPUs) which are computational elements that execute the computational methods described in FIGS. 1 and 2.

Further, the invention permits the real-time optimization of the HSI sensors while they are in operation by a method illustrated in FIG. 2.

Further, the invention permits the optimization and operational deployment of a processor utilizing cognitive image processing principals which analyzes sensor outputs (imagery and hyper-spectral data cubes) and annotates regions of potential threat or having a pre-determined characteristic equally at the same rate as the sensor is producing data. The invention permits the performance of analysts by significantly reducing the time required for assessment and distribution of results and improving the probability of potential threat detection and prioritization.

The invention overcomes the prior art deficiencies by emulating how the human visual path processes large data volumes and identifies regions or targets areas of salient interest. The invention's saliency processing approach relies on characterizing the spatial content (size, shape, orientation) and color content of the imagery from multiple spectra and characterizing the hyper-spectral data by determining locations where the spectral content matches that of known objects of interest and where locations show anomalous spectral signatures when compared to adjacent locations. This processing is accomplished in parallel and at an accelerated rate.

Figure 1:
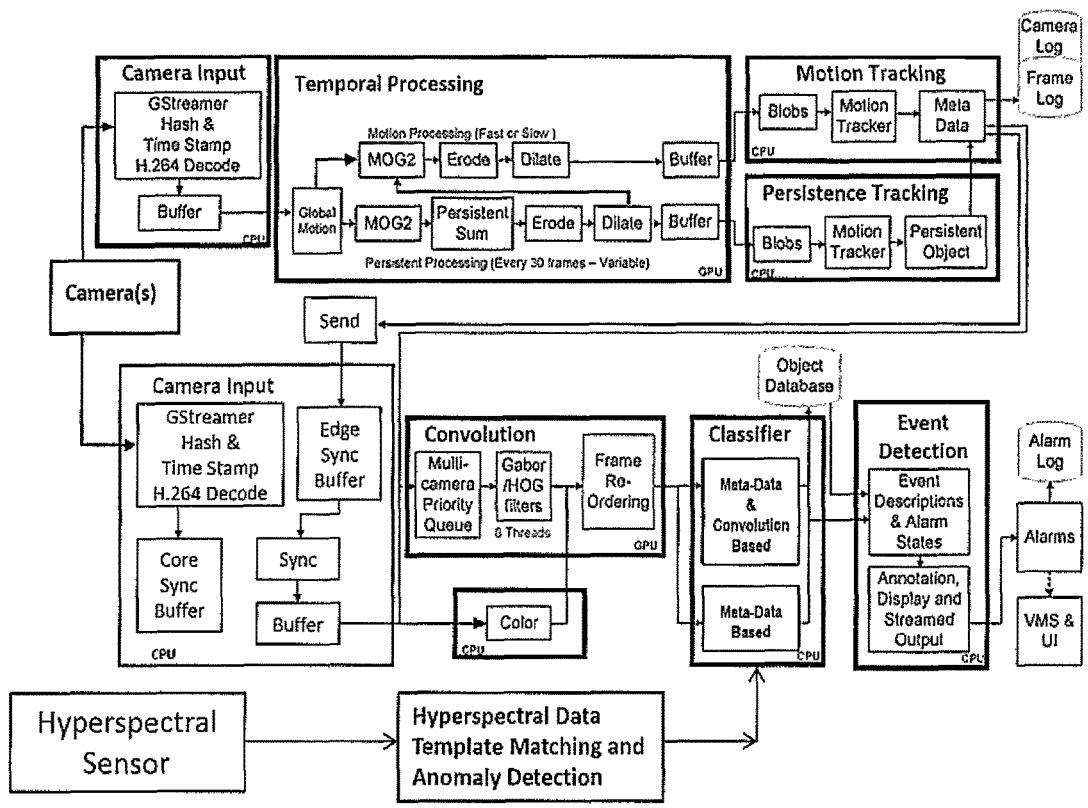
FIG. 1 illustrates the Hy-ALERT processor computational methods for simultaneous analysis of the content of cameras producing visible of thermal imagery, still or dynamic, and the content of hyperspectral sensors.

A preferred processing architecture is illustrated in FIG. 1.

The exploitation of cognitive processing to rapidly search large data streams and data bases, determine regions of high priority interest, and alert operator/analysts can lead to significant enhancement by providing improved support for intelligence, surveillance and reconnaissance or "ISR"

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a sub combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An image processing method comprising the steps of:
receiving a sensor input from at least one of a visible and a thermal imaging sensor observing a scene;
simultaneously receiving a data stream from a hyperspectral sensor observing the scene;
running an image processing algorithm on at least one of a spatial, temporal or color content of the received visible and thermal imaging sensor inputs to define an object content of the scene;
simultaneously processing the hyperspectral sensor data stream to identify a material in the scene by matching a spectral template against an embedded catalogue of material properties or by detecting a pixel with a spectral content different from a spectral content of a surrounding pixel to define a material content of the scene;
performing a correlation on the object content of the scene with the material content of the scene;
determining a location in the scene where a spectra of a the content matches a known object of interest or where a location in the scene shows an anomalous spectral signature when compared to an adjacent location in the scene.

2. The method of claim 1 further comprising changing a spectral response of the hyperspectral sensor based at least in part on a degree of correlation between a location of the object of interest in the scene and a location of the material in the scene.

3. The method of claim 1 wherein the hyperspectral sensor comprises a plasmonic sensor.

* * * * *